United States Patent
Porret et al.

[15] 3,635,845
[45] Jan. 18, 1972

[54] CURABLE COMPOSITIONS OF MATTER CONTAINING A POLYEPOXIDE AND A HYDRANTOIN COMPOUND

[72] Inventors: Daniel Porret, Binningen; Juergen Habermeier, Allschwil; Wolfgang Seiz, Basel, all of Switzerland

[73] Assignee: Ciba Limited, Basel, Switzerland

[22] Filed: Nov. 18, 1969

[21] Appl. No.: 877,845

[30] Foreign Application Priority Data

Nov. 28, 1968 Switzerland..........................17735/68

[52] U.S. Cl. ......................260/2 N, 117/161 ZB, 161/184 R, 260/9 R, 260/28 R, 260/29.1 R, 260/37 EP, 260/47 EN, 260/59 R, 260/77.5 R, 260/78.4 EP, 260/830 TW, 260/831 R, 260/834 R
[51] Int. Cl..............................................................C08g 30/14
[58] Field of Search...........260/47 EP, 2 EP, 78.4 EP, 18 EP, 260/59 R, 830, 77.5

[56] References Cited

FOREIGN PATENTS OR APPLICATIONS 3,517,232   11/1960   Japan
  963,507    7/1964   Great Britain.....................260/47 EP Primary Examiner—William H. Short
Assistant Examiner—T. Pertilla
Attorney—Harry Goldsmith, Joseph G. Kolodny and Mario A. Monaco

[57] ABSTRACT

Curable moulding, coating and adhesive compositions which contain a polyepoxide compound, for example a liquid polyglycidyl ether of bisphenol A and, as the curing agent, a 1,1'-methylene-bis-(3-γ-aminopropyl-hydantoin), for example 1,1'-methylene-bis-(3-γ-aminopropyl-5,5-dimethyl-hydantoin). The curing can take place at relatively low temperatures. The new type of curing agent bridges, in the gradation of the activity, a gap between aliphatic polyamines and cycloaliphatic polyamines. The new curing agents furthermore have the advantage, relative to the aromatic polyamines, of being nontoxic.

11 Claims, No Drawings

CURABLE COMPOSITIONS OF MATTER CONTAINING A POLYEPOXIDE AND A HYDRANTOIN COMPOUND

It is known that epoxide resins can be cured by monobasic or polybasic aliphatic, cycloaliphatic or aromatic amines. Curing with aliphatic amines, such as diethylenetriamine, triethylenetetramine or hexamethylenediamine leads, even in the cold or at room temperature, to products having good mechanical properties which however do not always suffice for the highest requirements. The aliphatic polyamines are furthermore not physiologically harmless. The cycloaliphatic polyamines, such as diaminocyclohexylmethane, are as a rule less toxic than the aliphatic polyamines, but on the other hand cure more slowly and the cure temperatures which are only moderately above room temperature it is in general not possible to achieve optimum properties of castings of coatings.

Curable mixtures of epoxide resins and aromatic polyamines, such as phenylenediamine or 4,4'-diaminodiphenylmethane, can as a rule only be cured at higher temperatures to give industrially usable products. Furthermore the aromatic amines are more or less strongly toxic.

Thus the following sequence of reactivity applies to the main classes of amine curing agents known as curing agents for epoxide resins: aliphatic amines > cycloaliphatic amines > aromatic amines.

For practical requirements, a gap hitherto existed in the reactivity gradation between the aliphatic amines and the cycloaliphatic amines. It has now been found that by the use of certain diprimary diamines containing two heterocyclic nuclei and in particular 1,1'-methylene-bis-(γ-aminopropyl-hydantoins), it is possible to bridge this previous gap.

The physiologically harmless 1,1'-methylene-bis-(γ-aminopropyl-hydantoins) are furthermore, for many end uses, a fully equivalent replacement for the toxic aromatic amines hitherto usual as curing agents for these purposes.

The subject of the present invention are curable mixtures which are suitable for the manufacture of mouldings, impregnations, coatings and adhesive bonds and which are characterized in that they contain (a) a polyepoxide compound with an average of more than one epoxide group in the molecule and (b) as the curing agent, a 1,1'-methylene-bis-(N-γ-aminopropyl-hydantoin) of formula

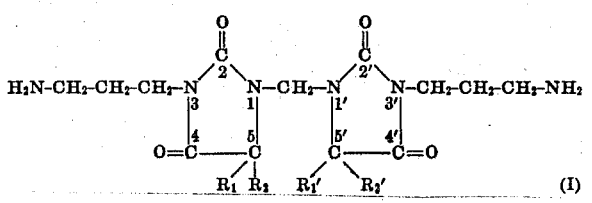

(I)

wherein $R_1$, $R_1'$, $R_2$ and $R_2'$ independently of one another each denote hydrogen atoms or an aliphatic or cycloaliphatic hydrocarbon residue, or wherein $R_1$ and $R_2$ and/or $R_1'$ and $R_2'$ together form a divalent aliphatic or cycloaliphatic hydrocarbon residue, preferably a tetramethylene or pentamethylene residue.

Preferably, the symbols $R_1$, $R_1'$, $R_2$ and $R_2'$ in the above formula (I) denote hydrogen atoms or lower alkyl residues with one to four carbon atoms, especially the methyl group.

As methylene-bis-(γ-aminopropyl-hydantoins) of formula (I) there may for example be mentioned: 1,1'-methylene-bis-(3-γ-aminopropyl-5-isopropyl-hydantoin) and 1,1'-methylene-bis-(3-γ-aminopropyl-5,5-dimethyl-hydantoin).

Methylene-bis-(γ-aminopropyl-hydantoins) of formula (I) can be conveniently manufactured by cyanethylation of a bis-(hydantoin) of formula

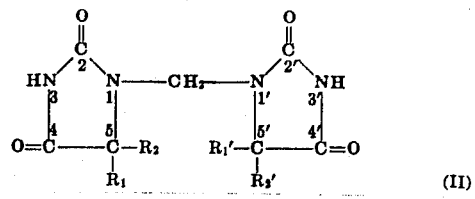

(II)

wherein $R_1$, $R_1'$, $R_2$ and $R_2'$ have the above-mentioned significance, and subsequent catalytic hydrogenation of the resulting 1,1'-methylene-bis-(N-β-cyanethyl-hydantoins) in the presence of ammonia and a hydrogenation catalyst such as for example Raney nickel or Raney cobalt.

Hydantoins of formula (II) which are subjected to cyanethylation can be easily obtained by condensation of 2 mols of a hydantoin of formula

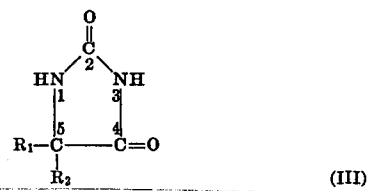

(III)

with 1 mol of formaldehyde.

As hydantoins of formula (III) there may for example be mentioned: hydantoin, 5-methyl-hydantoin, 5-n-propyl-hydantoin, 5-isopropyl-hydantoin, 1,3-diazaspiro(4.4)decane-2,4-dione, 5,5-diethyl-hydantoin, 5-methyl-5-ethyl-hydantoin and especially 5,5-dimethylhydantoin.

Preferably, the bis-(5,5-dimethylhydantoinyl-1)-methane accessible by condensation of 2 mols of 5,5-dimethylhydantoin and 1 mol of formaldehyde is used as the starting substance of formula (II).

The compound 1,1'-methylene-bis-(3-γ-aminopropyl-5,5-dimethyl-hydantoin) newly proposed as a curing agent, and its manufacture, are described in Japanese Pat. specification No. 276,504. Its use as a curing agent for epoxide resins is however therein neither mentioned nor rendered obvious to the expert.

Appropriately, 0.5 to 1.3 equivalents, preferably about 1.0 equivalent, of nitrogen-bonded active hydrogen atoms of the 1,1'-methylene-bis-(N-γ-aminopropyl-hydantoin) of formula (I) are used per 1 equivalent of epoxide groups of the polyepoxide compound (a).

Possible polyepoxide compounds (a) are above all those with an average of more than one glycidyl group, β-methyl-glycidyl group or 2,3-epoxycyclopentyl group bonded to a heteroatom (for example sulphur, preferably oxygen or nitrogen); the following may be mentioned especially: bis(2,3-epoxycyclopentyl)ether, diglycidyl ethers or polyglycidyl ethers of polyhydric aliphatic alcohols, such as 1,4-butanediol, or polyalkylene glycols, such as polypropylene glycols; diglycidyl ethers or polyglycidyl ethers of cycloaliphatic polyols, such as 2,2-bis-(4-hydroxycyclohexyl)propane; diglycidyl ethers or polyglycidyl ethers of polyhydric phenols, such as resorcinol, bis-(p-hydroxyphenyl)methane, 2,2-bis(p-hydroxyphenyl)-propane (=diomethane), 2,2-bis(4'-hydroxy-3',5'-dibromophenyl)-propane, 1,1,2,2-tetrakis-(p-hydroxyphenyl)ethane, or of condensation products of phenols with formaldehyde obtained under acid conditions, such as phenol novolacs and cresol novolacs; di- and poly-(β-methyl-glycidyl)ethers of the above-mentioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p-amino-phenyl)-methane; triglycidyl-isocyanurate; N,N'-diglycidyl-ethyleneurea; N,N'-diglycidyl-5,5-dimethyl-hydantoin, N,N'-diglycidyl-5-isopropyl-hydantoin; N,N'-diglycidyl-5,5-dimethyl-6-isopropyl-5,6-dihydro-uracil.

If desired, active diluents such as for example styrene oxide, butyl glycidyl ether, isooctyl glycidyl ether, phenylglycidyl ether, cresyl glycidyl ether or glycidyl esters of synthetic highly branched mainly tertiary aliphatic monocarboxylic acids ("CARDURA E") can be added to the polyepoxides in order to lower the viscosity.

The curing of the curable mixtures according to the invention to give mouldings and the like is appropriately carried out in the temperature range of 20° to 120° C. The curing can, in a known manner, also be carried out in two or more stages, with the first curing stage being carried out at a lower temperature (for example about 40° C.) and the post-curing at a higher temperature (for example 100° C.).

The curing can, if desired, also be carried out in two stages by first prematurely stopping the curing reaction or carrying out the first stage at room temperature or at only slightly elevated temperature, whereupon a curable precondensate which is still fusible and soluble (a so-called "B-stage") is obtained from the epoxide component (a) and the amine curing agent (b). Such a precondensate can for example serve for the manufacture of "prepregs," compression moulding compositions or sintering powders.

In order to shorten the gelling times or cure times, known accelerators for curing with amines, for example monophenols or polyphenols, such as phenol or diomethane, salicylic acid, tertiary amines or salts of thiocyanic acid, such as $NH_4SCN$, can be added.

The term "curing" as used here denotes the conversion of the soluble, either liquid or fusible, polyepoxides into solid, insoluble and infusible, three-dimensional cross-linked products or materials, and in particular as a rule with simultaneous shaping to give mouldings, such as castings, pressings, laminates and the like or "two-dimensional structures" such as coatings, lacquer films or adhesive bonds.

The curable mixtures according to the invention from polyepoxide compounds (a) and 1,1'-methylene-bis-(γ-aminopropylhydantoins) of formula (I) as curing agents can furthermore be mixed, in any stage before curing, with usual modifiers, such as extenders, fillers and reinforcing agents, pigments, dyestuffs organic solvents plasticizers, flow control agents, agents for conferring thixotropy, flameproofing substances or dioxide, carbon black, graphite, oxide colors such as iron oxide, or metal powders, such as aluminum powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols can be employed as plasticizers for modifying the curable mixtures.

Silicones, cellulose acetobutyrate, polyvinyl butyral, waxes, stearates and the like (which is part are also employed as mould release agents) can be added as flow control agents when employing the curable mixtures, especially in surface protection.

Especially for use in the lacquer field, the polyepoxide compounds can furthermore be partially esterified in a known manner with carboxylic acids, such as especially higher unsaturated fatty acids. It is furthermore possible to add other curable synthetic resins, for example phenoplastics or aminoplastics, to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled state, optionally in the form of solutions or emulsions, as paints, lacquers, as sintering powders, compression moulding compositions, injection moulding formulations, dipping resins, casting resins, impregnating resins, binders adhesives, as tool resins, laminating resins, sealing and filling compositions, floor covering compositions and binders for mineral aggregates.

In the examples which follow, unless otherwise stated, parts denote parts by weight and percentages denote percentages by weight. Parts by volume to parts by weight have the same relation as the milliliter to the gram.

The following epoxide resins were used for the manufacture of curable mixtures described in the examples:

Epoxide Resin A

Polyglycidyl ether resin (industrial product) manufactured by condensation of diomethane (2,2-bis(p-hydroxyphenyl)-propane) with a stoichiometric excess of epichlorhydrin in the presence of alkali, consisting mainly of diomethane-diglycidyl ether of formula

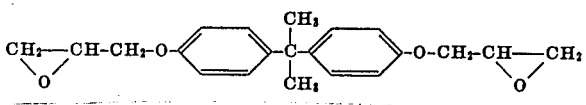

which is liquid at room temperature and has the following characteristics:

Epoxide content: 5.1–5.5 epoxide equivalents/kg.
Viscosity (Hoeppler) at 25° C.: 9,000–13,000 cp.

Plasticized Epoxide Resin Mixture B

Mixture of 95 parts of a polyglycidyl ether resin (industrial product) manufactured by condensation of diomethane with a stoichiometric excess of epichlorhydrin in the presence of alkali, consisting mainly of diomethane-diglycidyl ether. which is liquid at room temperature and has the following characteristics:

Epoxide content: approx. 5.35 epoxide equivalents/kg.
Viscosity (Hoeppler) at 25° C.: 5,000–6,400 cp.

and of 5 parts of a resin of low viscosity (industrial product) manufactured by condensation of 1 mol of polypropylene glycol of average molecular weight 425 and a stoichiometric excess (4 mols) of epichlorhydrin, consisting mainly of the diglycidyl ether of the polypropylene glycol and having the following characteristics:

Epoxide content: 2.3–2.8 epoxide equivalents/kg.
Viscosity at 25° C.: approx. 175 cp.

Epoxide Resin C

Liquid hexahydrophthalic acid diglycidyl ester (industrial product):

Epoxide content: 6.3 epoxide equivalents/kg.
Viscosity (Hoeppler) at 25° C.: 475 cp.

Epoxide Resin D

Polyglycidyl ether resin (industrial product) consisting mainly of the diglycidyl ether of 2,2-bis-(4'-hydroxycyclohexyl)-propane of formula

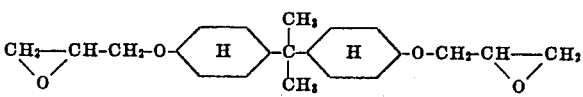

which is liquid at room temperature and has the following characteristics:

Epoxide content: 4.46 epoxide equivalents/kg.
Viscosity (Hoeppler) at 25° C.: 2,140 cp.

The 1,1'-methylene-bis-(γ-aminopropyl-hydantoins) used as curing agents in the subsequent examples were manufactured as follows:

1. Manufacture of 1,1'-methylene-bis-(3-γ-aminopropyl-5,5-methyl-hydantoin):

A mixture of 187 g. (0.5 mol) of 1,1'-methylene-bis-(3-β-cyanethyl-5,5-dimethyl-hydantoin), 37.4 g. of Raney nickel, 1 liter of 1,4-dioxane and 60 g. of ammonia gas is hydrogenated at 100° C. and 100 atmospheres hydrogen pressure in a stirred autoclave over the course of 12 hours. The resulting solution is filtered in order to separate off the nickel and is subsequently concentrated to constant weight on a rotary evaporator (80° C./0.1 mm. Hg).

195 g. of a product of high viscosity consisting of 1,1'-methylene-bis-(3-γ-aminopropyl-5,5-dimethyl-hydantoin) and having an amine group content of 4.87 equivalents per kg. (93.0 percent of theory) are obtained.

2. Manufacture of 1,1'-methylene-bis-(3-γ-aminopropyl-5-isopropyl-hydantoin):

A mixture of 201 g. (0.5 mol) of 1,1'-methylene-bis-(3-β-cyanethyl-5-isopropyl-hydantoin), 20 g. of Raney nickel, 200 ml. of isopropyl alcohol and 60 g. of ammonia gas is hydrogenated in a stirred autoclave over the course of about 6 hours at 100° C. and 125 atmospheres hydrogen pressure. The solution is freed of the catalyst by filtration and is next completely concentrated on a rotary evaporator at about 80° C. bath temperature and about 20 mm. Hg. Remnants of volatile constituents which are still present are removed at the same bath temperature but at a pressure of about 0.1 mm. Hg.

196 g. (96.5 percent of theory) of a highly viscous product consisting of 1,1'-methylene-bis-(3-γ-aminopropyl-5-isopropyl-hydantoin) and having an amine group content of 4.6 equivalents/kg. are obtained.

For determining the mechanical and electrical properties of the curable mixtures described in the examples which follow, sheets of 135×135×4 mm. were manufactured for determining the flexural strength, deflection, impact strength and water absorption. The test specimens (60×10×4 mm.) for determining the water absorption and for the flexing test and impact test (VSM 77103 or 77105 respectively) were machined from the sheets.

Test specimens of dimensions 120×15×10 mm. were in each case cast for determining the heat distortion point according to Martens (DIN 53,458).

EXAMPLE 1

100 g. of epoxide resin A (liquid diomethane-diglycidyl ether having an epoxide content of 5.23 epoxide equivalents/kg. and a viscosity of approx. 9,500 cp. at 25° C.) are homogeneously mixed at 40° C. with 50 g. of 1,1'-methylene-bis-(3-γ-amino-propyl-5,5-dimethyl-hydantoin) having an amine group content of 4.87 equivalents/kg. Ground, degreased aluminum sheets obtainable under the registered trade name "Anticorrodal B" (170×25×1.5 mm.; overlap 10 mm.) are glued with the mixture thus obtained and fully cured at 40° C. over the course of 24 hours.

The samples cured in this way have a tensile shear strength of 0.52 kp./mm.$^2$ measured at room temperature.

EXAMPLE 2

120 g. of the plasticized liquid epoxide resin mixture B are homogeneously mixed at 80° C. with 71.5 g. of 1,1'-methylene-bis-( 3-γ-aminopropyl-5,5-dimethyl-hydantoin) having an amine group content of 4.89 equivalents/kg. and the resulting mixture is poured into aluminum moulds (135×135× 4 mm.) prewarmed to 80° C. Curing is carried out for 5 hours at 80° C.

Castings having the following properties are obtained:
Flexural strength (VSM 77,103)     16.8 kg./mm.$^2$
Impact strength (VSM 77,105)      12.3 cm.kg./cm.$^2$
Heat distortion point according to Martens (DIN 53,458) 87° C.

EXAMPLE 3

100 g. of epoxide resin A (liquid diomethane-diglycidyl ether having an epoxide content of 5.23 epoxide equivalents/kg. and a viscosity of approx. 9,500 cp. at 25° C.) and 56 g. of 1,1'-methylene-bis-(3-γ-aminopropyl-5-isopropylhydantoin) having an amine group content of 4.6 equivalents/kg. were carefully mixed and poured into a prewarmed mould in order to manufacture a sheet of dimensions 135×135×4 mm. The mixture was cured for 24 hours at 40° C. and post-cured for 6 hours at 100° C.

Test specimens of dimensions 60×10×4 mm. for determining the flexural strength, deflection, impact strength and weight increase on storage in water (4 days, 20° C.) were manufactured from the sheet of the cured moulded material thus obtained.

Determination of these properties gave the following results:
Flexural strength (VSM 77,103)    13.0 kg./mm.$^2$
Deflection (VSM 77,103)           11.1 mm.
Impact strength (VSM 77,105)      29.6 cm.kg./cm.$^2$
Weight increase on storage in water (4 days, 20° C.) 0.43 percent

EXAMPLE 4

10 g. of epoxide resin C (liquid hexahydrophthalic acid diglycidyl ester having a viscosity of 475 cp. at 25° C. and an epoxide content of 6.3 epoxide equivalents/kg.) were carefully mixed with 6.8 g. of 1,1'-methylene-bis-(3-γ-aminopropyl-5-isopropyl-hydantoin) having an amine group content of 4.6 equivalents/kg.

A part of the mixture was spread on the ends, previously roughened by grinding and cleaned by washing with acetone, of test strips of an aluminum alloy (registered trade name "Anticorodal B") of dimensions 170×25×1.5 mm. Two of these test strips at a time were so lined up by means of a gauge that the ends spread with the resin-curing agent mixture overlap by 10 mm. The resin-curing agent mixture here used as the adhesive was cured at 40° C. for 24 hours and post-cured at 100° C. for 6 hours. The test specimens were then cooled to room temperature and the tensile shear strength of the adhesive bond was determined in the tensile test.

A tensile shear strength of 0.77 kg./mm.$^2$ was obtained as the mean value from three determinations.

The remainder of the resin-curing agent mixture was applied to an aluminum sheet of dimensions 150×70×0.8 mm. and the coating thus obtained was also cured for 24 hours at 40° C. + 6 hours at 100° C. The resin layer on the sheet metal substrate was scratch-resistant but somewhat brittle. It no longer became tacky on treatment with an acetone-soaked cottonwool pad.

EXAMPLE 5

10 g. of epoxide resin D (liquid diglycidyl ether of 2,2-bis-(4'-hydroxycyclohexyl)-propane having an epoxide content of 4.46 epoxide equivalents/kg. and a viscosity of 2,140 cp.) were carefully mixed with 4.75 g. of 1,1'-methylene-bis-(3-γ-amino-propyl-5-isopropyl-hydantoin) having an amine group content of 4.6 equivalents/kg. and test strips of "Anticorodal B" were glued therewith, as in the preceding example 4, for determining the tensile shear strength. The test of the tensile shear strength after curing for 24 hours at 40° C. + 6 hours at 100° C. gave a value of 1.35 kg./mm.$^2$ as a mean value from three determinations.

The remainder of the resin-curing agent mixture, spread on the sheet metal as a thin layer and cured under the same conditions, gave a scratch-resistant coating which after treatment with an acetone-soaked cottonwool pad no longer became tacky.

We claim:

1. A composition of matter which comprises (a) a 1,2-polyepoxide compound with an average of more than one 1,2-epoxide group in the molecule and (b) as the curing agent, a 1,1'-methylene-bis-(N-γ-aminopropyl-hydantoin) of formula

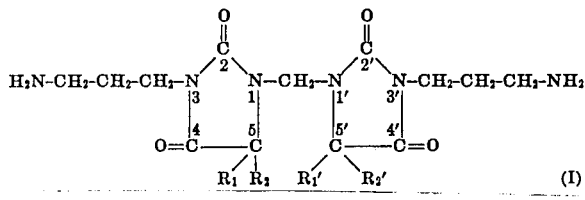

wherein $R_1$, $R_1'$, $R_2$ and $R_2'$ each represents a member selected from the group consisting of a hydrogen atom and an alkyl residue with one to four carbon atoms, and when $R_1$ and $R_2$ are taken together, and when $R_1'$ and $R_2'$ are taken together they form a tetramethylene or pentamethylene residue.

2. A composition according to claim 1 which contains 1,1'-methylene-bis-(3-γ-aminopropyl-5,5-dimethyl-hydantoin) as the curing agent (b).

3. A composition according to claim 1 which contains 1,1'-methylene-bis-(3-γ-aminopropyl-5-isopropyl-hydantoin) as the curing agent (b).

4. A composition according to claim 1 which contains 0.5 to 1.3 equivalent of nitrogen-bonded active hydrogen atoms of the 1,1'-methylene-bis-(N-γ-aminopropyl-hydantoin) (b) per 1 equivalent of epoxide groups of the polyepoxide compound (a).

5. A composition according to claim 1 which contains a polyepoxide compound (a) having an average of more than one glycidyl group, β-methylglycidyl group or 2.3-epoxycyclopentyl group bonded to a heteroatom in the molecule.

6. A composition according to claim 1 which contains a polyglycidyl ether of a polyhydric phenol as the polyepoxide compound (a).

7. A composition according to claim 6 which contains a polyglycidyl ether of 2,2-bis-(p-hydroxyphenyl)-propane as the polyepoxide compound (a).

8. A composition according to claim 1 which contains a polyglycidyl ester of a polycarboxylic acid as the polyepoxide compound (a).

9. A composition according to claim 8 which contains the diglycidyl ester of Δ⁴-tetrahydrophthalic acid or hexahydrophthalic acid as the polyepoxide compound (a).

10. A composition according to claim 1 which contains a polyglycidyl ether of a cycloaliphatic polyol as the polyepoxide compound (a).

11. A composition according to claim 10 which contains the diglycidyl ether of 2,2-bis-(4-hydroxycyclohexyl)-propane as the polyepoxide compound (a).

* * * * *

CASE 6604/E

PO-1050
(5/69)

UNITED STATES PATENT OFFICE
CERTIFICATE OF CORRECTION

Patent No. 3,635,845      Dated January 18, 1972

Inventor(s) DANIEL PORRET ET AL

It is certified that error appears in the above-identified patent and that said Letters Patent are hereby corrected as shown below:

Delete the title and substitute the following --- CURABLE COMPOSITIONS OF MATTER CONTAINING A POLYEPOXIDE AND A HYDANTOIN COMPOUND ---.

Column 8, line 4, delete "2.3-epoxy-" and substitute --- 2,3-epoxy- ---.

Signed and sealed this 13th day of June 1972.

(SEAL)
Attest:

EDWARD M. FLETCHER, JR.
Attesting Officer

ROBERT GOTTSCHALK
Commissioner of Patents